E. P. BALLOU.
WEDGE.
APPLICATION FILED JAN. 31, 1912.
1,034,860.
Patented Aug. 6, 1912.
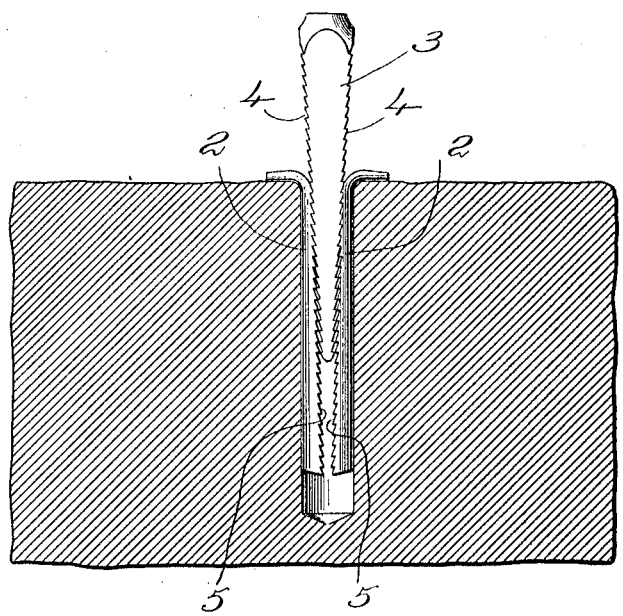
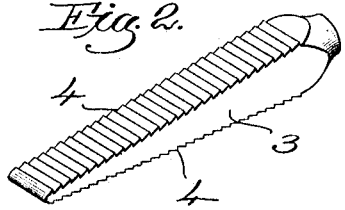
Witnesses.
Thomas J. Drummond
Warren O'Neil
Inventor.
Edward P. Ballou,
By Edwards Heard & Smith
Attys.

UNITED STATES PATENT OFFICE.

EDWARD P. BALLOU, OF MAGNOLIA, MASSACHUSETTS.

WEDGE.

1,034,860.  Specification of Letters Patent.  Patented Aug. 6, 1912.

Application filed January 31, 1912. Serial No. 674,481.

*To all whom it may concern:*

Be it known that I, EDWARD P. BALLOU, a citizen of the United States, residing at Magnolia, Massachusetts, have invented an Improvement in Wedges, of which the following description, in connection with the accompanying drawing, is a specification, like characters on the drawing representing like parts.

The invention has for its object to provide for a construction of wedge and coöperating half-rounds for use especially in stone work, by means of which the wedge is always held in place and prevented from being forced outwardly by the pressure against its faces.

The nature of the invention will appear more fully from the accompanying description and drawings and will be particularly pointed out in the appended claims.

The drawings show a preferred form of wedge alone and in connection with a preferred form of half-rounds.

In the drawings: Figure 1 is a view in cross section of a section of stone drilled as for splitting with a construction of wedge and half-rounds embodying this invention and in place in the drill hole; Fig. 2 is a view in perspective of a preferred form of wedge.

When a wedge of the ordinary type is driven in for any purpose and in many materials, the side pressure produced against the converging faces of the wedge tends to force the wedge outwardly, and frequently the wedge is forced outwardly with such force as to be a danger to the person driving the wedge. This is particularly true of the operation of wedges in quarrying and in working upon stone, although it often happens when a wedge is driven into wood or other material.

When wedges are used in connection with stone work, as for example when splitting stone, it is customary to drill a substantially cylindrical hole in the stone and then insert what are known as half-rounds. These devices are in the general shape of a segment of a cylinder, but usually with their opposing flat faces converging slightly inwardly so that the half-rounds themselves are thicker at the lower ends than at the upper ends. The upper ends are usually bent over so that the half-rounds may be hung in the drill hole when that hole extends downwardly. Such devices are shown at 2, 2 in Fig. 1 of the drawing, but they have heretofore been provided with substantially smooth, flat opposed surfaces.

The half-rounds are usually made of soft iron, while the wedge indicated at 3 in Fig. 1, but heretofore provided with substantially smooth converging faces, is made of steel. When the wedge is driven in place the tremendous side pressure produced between the adjacent faces of the half-rounds and the wedge tend to force the wedge outwardly, and it is often hurled out with sufficient force to injure and even to kill the operator. Furthermore, it is very difficult to set the wedge in place when the hole extends in an upward direction. In this invention the converging side faces 4 of the wedge are provided with corrugations extending in a generally transverse direction to the length of the wedge. These corrugations may be of a variety of forms and shapes. The half-rounds are also preferably provided on their flat faces 5 with similar corrugations, although it is not essential to the invention in its broadest aspect that the corrugations should be employed on the half rounds, because the wedge is so much harder than the half-rounds that it will grip if its faces alone are corrugated.

Having fully described my invention, what I claim as new and desire to secure by Letters Patent is:

1. A wedging device comprising a pair of wedge shaped half-rounds adapted to fit in a hole with their rounded surfaces against the wall of the hole and with their flat surfaces converged inwardly, a wedge of harder material than that of the half-rounds provided with transverse corrugations on its inclined faces whereby when the wedge is driven in between the half-rounds it will be gripped and held thereby and pressure will be exerted on the walls of the hole transversely to the axis.

2. A wedging device comprising a pair of wedge shaped half-rounds adapted to fit in a hole with their rounded surfaces against the wall of the hole and with their flat surfaces converging inwardly and provided with transverse corrugations, a wedge provided with transverse corrugations on its inclined faces whereby when the wedge is driven in between the half-rounds it will be gripped and held thereby and pressure will be exerted on the walls of the hole transversely to the axis.

In testimony whereof, I have signed my name to this specification, in the presence of two subscribing witnesses.

EDWARD P. BALLOU.

Witnesses:
LAFAYETTE F. HUNT,
FRED S. LYCETT.